United States Patent [19]

Moyer et al.

[11] 3,745,644
[45] July 17, 1973

[54] METHOD FOR ATTACHING SOLDER RINGS TO WORK PIECES

[75] Inventors: Ross Moyer, Tully; Fred Karandy, East Syracuse, both of N.Y.

[73] Assignee: Carrier Corporation, Syracuse, N.Y.

[22] Filed: July 28, 1971

[21] Appl. No.: 166,792

[52] U.S. Cl. ............... 29/515, 29/157.4, 29/484, 29/500, 228/56
[51] Int. Cl. ............................. B21d 39/00
[58] Field of Search ............ 228/56; 29/500, 501, 29/516, 157.4, 484, 515

[56] References Cited
UNITED STATES PATENTS

| | | | |
|---|---|---|---|
| 3,427,707 | 2/1969 | Nowosadko | 29/501 X |
| 3,111,157 | 11/1963 | Henry | 153/1 |
| 2,972,186 | 2/1961 | Howe | 29/516 |
| 2,471,650 | 5/1949 | Pandolfi | 228/56 X |
| 2,120,067 | 6/1938 | Gray et al. | 29/500 X |
| 607,504 | 7/1898 | Crowther | 228/56 |

Primary Examiner—J. Spencer Overholser
Assistant Examiner—Robert J. Craig
Attorney—Harry G. Martin, Jr. and J. Raymond Curtin

[57] ABSTRACT

By the method and apparatus herein disclosed, solder rings, formed of solder material capable of taking a permanent set upon deformation, are fixed on work pieces for subsequent soldering to other work pieces. The perimeter of a solder ring, positioned at a predetermined location on a work piece, is engaged at two points spaced apart less than 180°. The solder ring is engaged by projections on forming blades or jaws moved toward a plane extending transversely of the ring. Sufficient force is applied at the points of engagement to bow a portion of the ring intermediate the points of engagement outwardly from the work piece and to draw the remainder of the ring in tight engagement about the work piece. Preferably the forming blades are each provided with a pair of projections for engaging opposite sides of the ring to bow the intermediate portions of the ring outwardly at each side thereof.

4 Claims, 10 Drawing Figures

INVENTOR.
ROSS MOYER
FRED KARANDY

INVENTOR.
ROSS MOYER
FRED KARANDY

BY *Emmett Thompson*

ATTORNEY

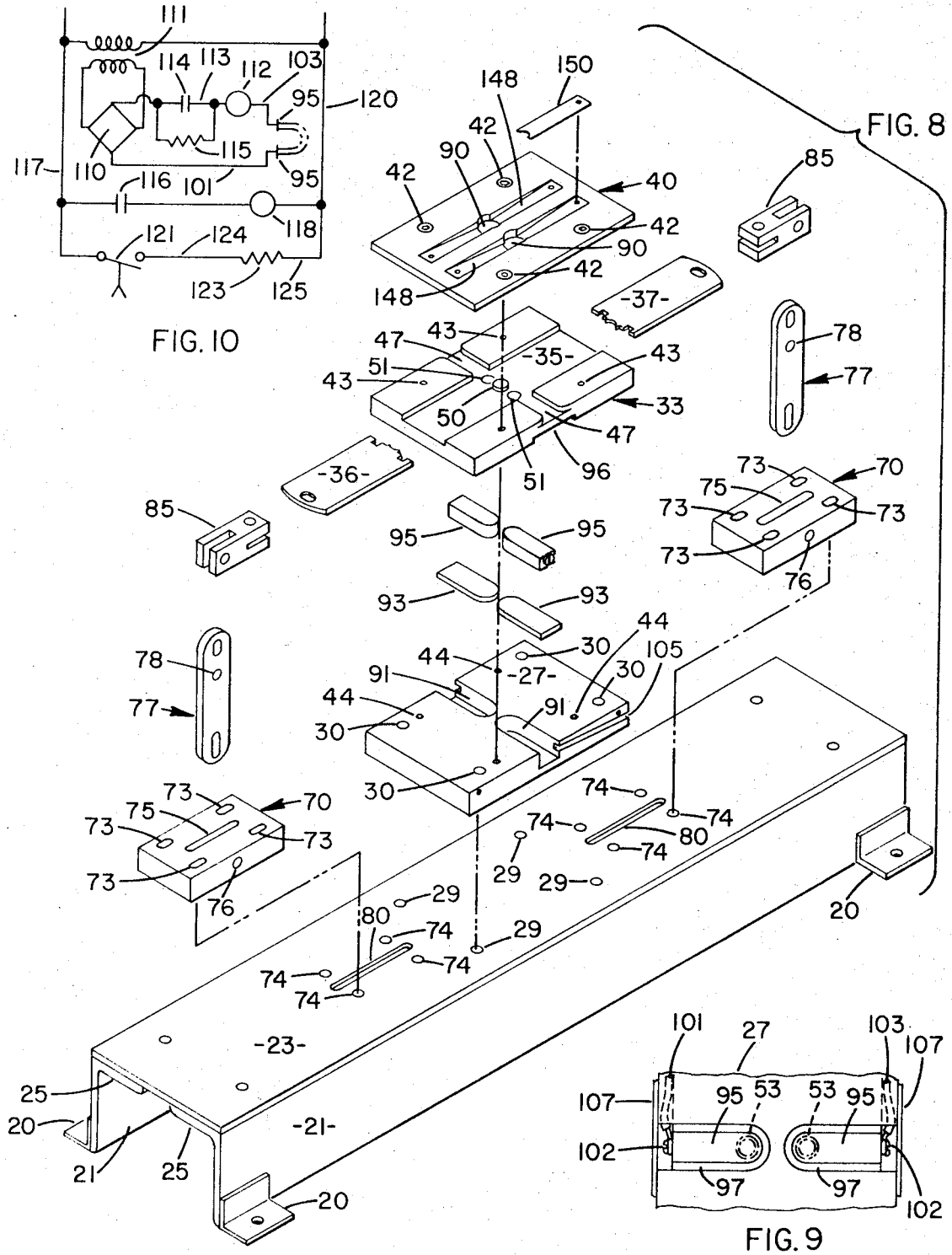

METHOD FOR ATTACHING SOLDER RINGS TO WORK PIECES

BACKGROUND OF THE INVENTION

In the attachment of work pieces by brazing or high temperature soldering, one of the pieces in many instances is provided with a solder ring or form. The pieces are joined and subjected to heat and the temperature raised sufficiently to cause the solder material to flow. On occasion, it is desirable or necessary that the solder form be initially arranged in a precise position on the work piece, and the work piece may not be formed with a shoulder or the like to serve to correctly orient the solder ring or form on the work piece. An example of a situation of that kind is encountered in the soldering of a tubular return bend fitting to the ends of tubes in a heat exchanger such as a condenser or evaporator used in air conditioning apparatus.

Various methods of affixing a solder ring to a return bend fitting have been proposed and used. The most common method is to use a split solder ring which is initially dimensional with an internal diameter slightly less than the outside diameter of the leg portions of the return bend. The solder ring is pressed onto the return bend, and, particularly in the case where the return bend is formed of aluminum tubing, the legs of the return bend are scored in a lengthwise direction. Such scoring degrades the quality of the soldered joint and often results in the joint leaking.

Another method is to form barbs on the legs of the return bend to prevent an initially oversized ring positioned on the return bend from falling off the return bend. This method is also unsatisfactory in that forming the barbs on the return bend of necessity results in scoring the same, with the great possibility of producing a defective joint as above stated. Also, if an attempt is made to prevent the solder ring from moving upwardly on the return bend, it is necessary to form barbs on the return bend legs prior to placing the rings on the legs. That requires a separate operation and adds to the scoring of the return bend.

The return bends, to which the solder rings are attached, are conveyed to the location at which the heat exchanger is fabricated and are positioned in the ends of the heat exchanger tubes. It is extremely important that the solder rings be uniformly positioned, within rather close tolerance, on the return bends and sufficiently affixed thereto so they will not move from the predetermined position on the return bends prior to the soldering operation. It is especially important that the affixed soldering rings do not become detached from the return bend fittings prior to the soldering operation. Also, that they do not get to be moved from the predetermined position in order that the fused ring will make a perfect joint, and that the ring will also serve for the automatic application of flux just prior to the soldering operation.

This invention has as an object a method and apparatus by which solder rings are initially fixedly secured to work pieces, such as the return bend fittings referred to, at a precise location on the work piece, without any damage or distortion to the work piece, and affixed in such a manner that they will not become detached from the work piece during subsequent handling prior to the soldering operation.

SUMMARY OF THE INVENTION

Solder rings, formed of solder material capable of taking a permanent set, following a forming operation, are fed successively to a ring applying station on a guide block. Forming blades are mounted on the guide block for movement toward and from the ring. Each blade is formed with at least one projection. When a work piece is properly positioned in a ring at the station, the blades are simultaneously actuated to move the projections thereon into engagement with the ring at points at opposite sides of the plane extending transversely of the ring. Force is applied to the blades to cause the portion of the ring intermediate the points of engagement to bow outwardly from the work piece and to draw the remainder of the ring into tight engagement with the work piece.

BRIEF DESCRIPTION OF THE DRAWINGS

FIG. 8 is an exploded view of the components involved in the structure of the apparatus;

FIG. 9 is a fragmentary view in reduced scale taken on line 9—9, FIG. 3; and

FIG. 10 is a schematic diagram of the circuitry for operating the apparatus.

DESCRIPTION OF THE PREFERRED EMBODIMENT

Figure 2:
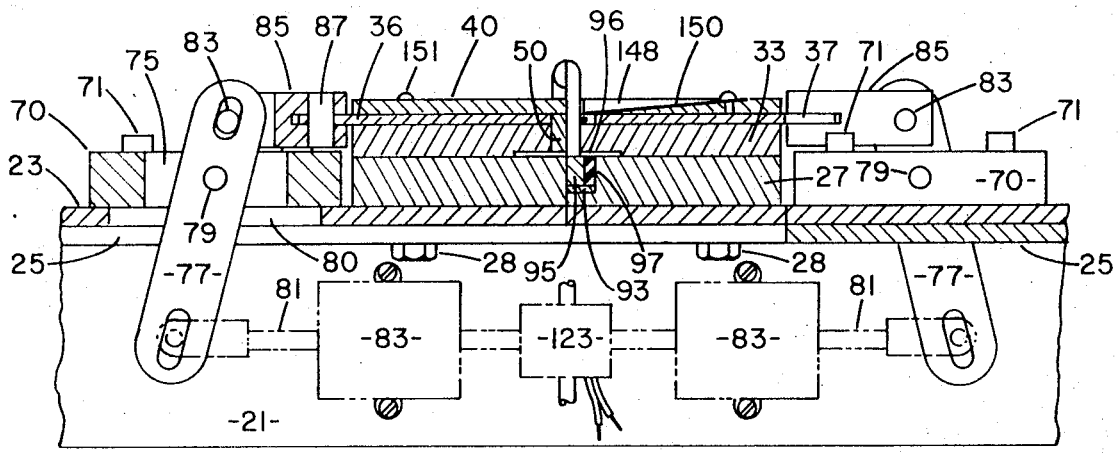
FIG. 2 is a lengthwise sectional view taken on line 2—2, FIG. 1.

The frame of the apparatus, in the form shown, consists of a sub base having side members formed of angle iron. Feet 20, FIG. 8, are fixed to the vertical flanges 21 of the side members. A plate 23 is fixed to the flanges 25. The frame further includes a base block 27 attached to the center portion of the plate 23 by cap screws 28 extending through holes 29 formed in the plate 23 and threading into tapped holes 30 in block 27 (see FIGS. 2 and 8).

A guide block 33 is positioned on the base block 27. The block 33 is formed in its upper surface with a lengthwise extending slot forming a guide way 35 for the forming blades 36, 37. The blades 36,37 are slidably retained in the guide way 35 by a cover plate 40 overlying the block 33. Screws 41 extend through holdes 42 in the cover plate 40, and holes 43 in the block 33 and thread into holes 44 in the base block 27.

Figure 3:
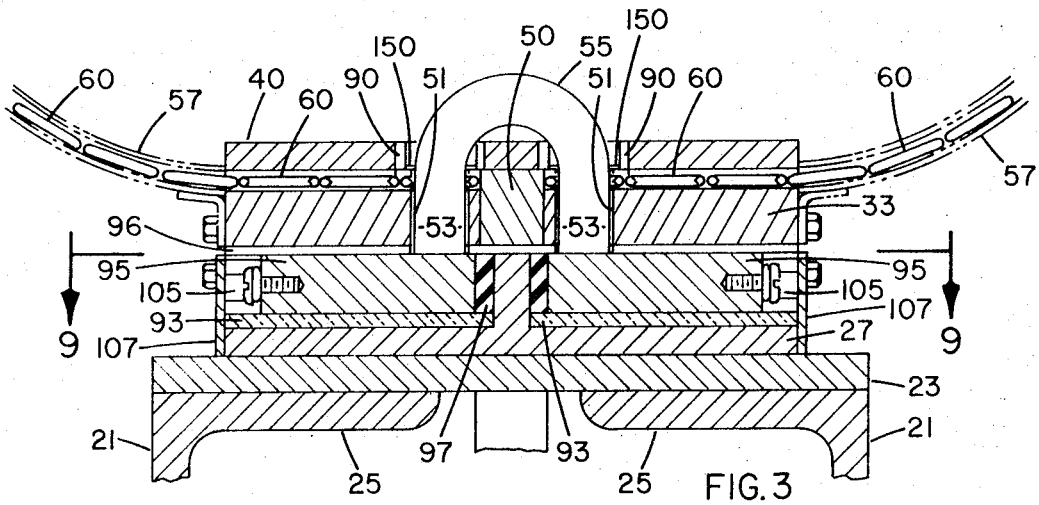
FIG. 3 is an enlarged transverse sectional view taken on line 3—3, FIG. 1.
Figure 4:
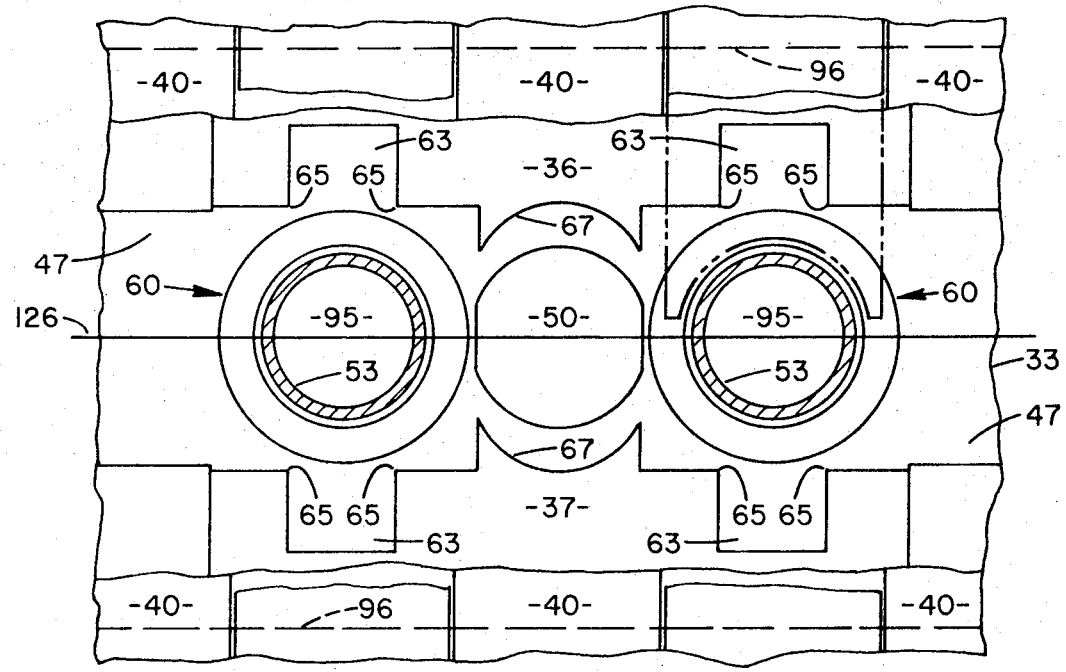
FIG. 4 is an enlarged view of the center portion of the apparatus shown in FIG. 1 with the center portion of the cover, and inner ends of the retaining springs removed, the inner ends of the forming blades and a pair of positioned solder rings being shown in top plane.

The guide block 33 is formed in its upper surface with slots 47, FIGS. 4 and 8, extending inwardly from each side edge of the block and communicating with the guide way 35. A stop 50 is fixedly mounted in the center of block 33. The stop 50 is located centrally in the guide way 35 and in registration with the slots 47. The block 33 is also formed with a through aperture 51 located at each side of the stop 50. These apertures 51 are spaced apart laterally and dimensioned for the reception of the leg portions 53 of the return bend 55, FIG. 3.

Figure 1:
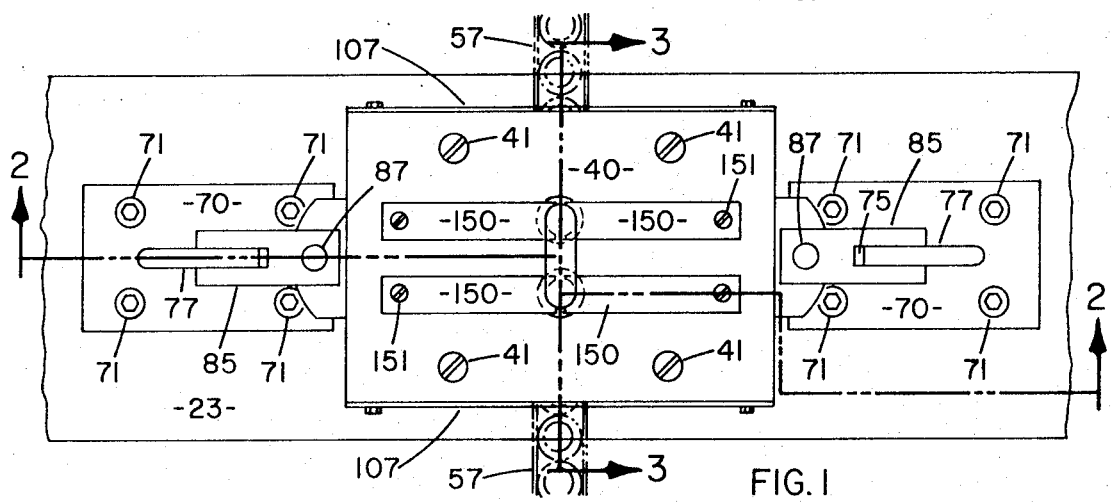
FIG. 1 is a top plane view of an embodiment of the apparatus suitable for carrying out our method.

Chutes 57 are fixed to the block 33 in registration with the slots 47 and serve to feed solder rings 60 to the slots 47 for engagement with opposite sides of the stop 50 (see FIGS. 1 and 3). The top of the stop 50 is flush with the top surface of the block 33, and the slots 47 have a depth sufficient for the free passage of the solder rings 60 beneath the cover plate 40.

Figure 5:
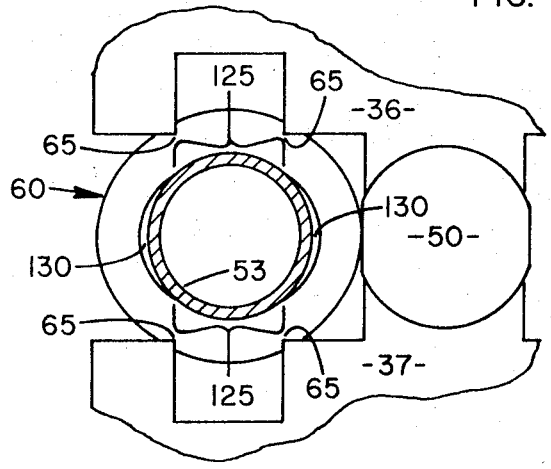
FIG. 5 is a view similar to the left-hand portion of FIG. 4 showing the forming blades in operated position and one solder ring fixed to the work piece.

The configuration of the inner ends of the blades 36,37 is best illustrated in the enlarged view, FIG. 4. The inner end of each forming blade is formed with a pair of projections or engagement points 65 for engaging the outside circumference or perimeter of the solder ring at points spaced apart thereon which form an arc of less than 180° as shown in FIG. 5. The projections are conveniently and economically formed by forming the blades with rectangular notches 63. The notches 63 provide sharp corners 65 serving as projections which travel in paths which are spaced from the center of the solder ring and work piece for engaging the solder rings 60. As described above, there are two blades 36,37 and the inner end of each blade is formed with a pair of notches 63 to provide a pair of projections 65 for engagement with each of a pair of solder rings 60 for application to the legs 53 of the return bend 55.

The inner ends of the blades 36,37 are also formed with a centrally located concave surface 67 shaped comparable to the stop 50. As the blades 36,37 are moved inwardly into engagement with the solder rings 60, the stop 50 serves to limit the extent of the inward movement of the blades.

A pivot block 70 is attached to the plate 23 of the frame structure outwardly from each end of the block 27. The blocks 70 are attached to the plate 23 by screws 71 extending through elongated holes 73 formed in each pivot block 70, and threading into tap holes 74 in plate 23. With this arrangement, the blocks are adjustable toward and from the blocks 27,33. Each of the blocks 70 is formed with an elongated slot 75, FIGS. 2 and 8, with an aperture 76 extending transversely of the block and the slot 75.

An actuating link 77 is positioned in each slot 75 and is apertured at 78 to receive a pivot pin 79 positiond in the aperture 76 of each block. The plate 23 is also formed with slots 80 in registration with the slots 75 in the pivot blocks 70. The links 77 extend downwardly through the slots 80 in plate 23, and are pivotally connected at their lower ends to piston rods 81 of cylinders 83 fixed to one of the side flanges 21 (see FIG. 2). The upper ends of the links 77 are pivotally joined by pins 83 to connectors 85. The opposite ends of the connectors are slotted to receive the outer ends of the forming blades 36, 37 to which they are attached by pins 87.

With a solder ring 60 positioned at each side of the stop post 50, the legs 53 of a return bend 55 are inserted through apertures 90 formed in the cover plate 40, and through the apertures 51 in the guide block 33.

Base block 27 is formed with a slot 91 extending inwardly from each side edge of the block. An insulating strip 93 is positioned in the bottom of each of the slots 91.

Contact plates 95 are positiond on the insulating strips 93. The contact plates 95 are dimensioned to provide a space between the plates and the walls of the slots 91 for the reception of epoxy resin insulating material 97. The upper surface of the plates 95 are positioned flush with the top surface of the block 27. However, they are not shorted by the guide block 33, due to the fact the under surface of the block is formed with a relieved area 96 extending transversely of the block. The area 96 also provides a passage through which a blast of air can be periodically directed to keep the contact plates clean. Accordingly, when a U-bend is inserted through the holes in the cover plate 40 and the guide block 33, the ends of the U-bend contact the plates 95, to complete a circuit to energize the blade actuating means.

A wire 101 is attached to one of the contact plates 95 by a screw 102. A wire 103 is similarly attached to the other contact plate 95. The wires 101, 103 extend through slots 105 formed in the side edges of the block 27. This portion of the electrical circuit is protected by a cover plate 107 secured to the block 27 as shown in FIGS. 1 and 3. Referring to FIG. 10, a rectifier 110 is powered from a transformer 111. The output of the rectifier is through wire 101, return bend 55 bridging contacts 95, wire 103, relay 112, wire 113 to the opposite side of the rectifier. A capacitor 114 is connected in wire 113 and is shunted by a resistor 115.

Upon insertion of the return bend 55, the capacitor 114 is charged to line voltage energizing relay 112 and closing its contact 116. A circuit is completed from line 117, through closed contacts 116, power relay 118 to the opposite side 120. Relay 118 is provided with a time delay contact 121 which is connected in circuit with a solenoid valve 123. The circuit includes contact 121, wire 124, solenoid valve 123, wire 125 to the side 120. With this arrangement, the low voltage pulse from capacitor 114 effects energization of the relay 112 to close contact 116 for energization of the power relay 118, the contact 121 of which will remain closed a sufficient length of time to operate the valve 123 to provide fluid to the cylinders 83 to effect simultaneous inward movement of the blades 36,37 toward a plane extending transversely of the ring as indicated by line 126, FIG. 4, for attaching the solder rings to the return bend. The timing of contact 121 is sufficient to provide for operation of the forming blades, thereafter the valve 123 is repositioned to exhaust the fluid from the cylinders 83 to permit the return of the forming blades to outward position by spring action contained in the cylinders 83.

The forming blades 36,37 are moved inwardly until they engage the stop 50. During this operation, the portions of the solder ring between the points engaged between projections 65, indicated at 125, FIG. 5, is drawn or stretched perimetrically against and about the legs 53 of the return bend. The side portions of the ring, intermediate the portions 125 engaged by the blades, are moved outwardly from the legs of the return bend, as shown in FIG. 5 by the space 130 between the return bend legs and the inner surface of the ring. That is an ellipital like form is imparted to the ring. A permanent set is imparted to this outwardly bowed portion with the result that the solder rings are tightly and permanently clamped onto the return bend legs. The initial clearance between the inner diameter of the rings and the legs of the return bends is greatly exaggerated in FIG. 4. Actually the clearance is only a matter of a few thousandths of an inch.

Figure 7:
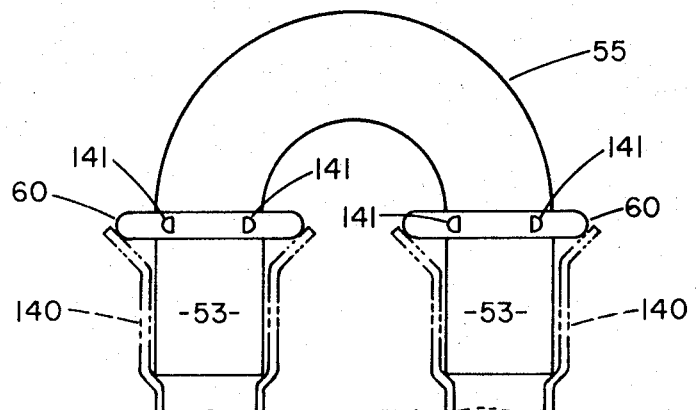
FIG. 7 is a side elevational view of a return bend with a pair of solder rings affixed thereto.

In opertion the solder rings move successively down the chutes 57 through the passages 47 to the position shown in FIG. 4. A return bend is inserted in the apertures in the guide block 33 and the blades 36,37 are moved into engagement with the rings in which the return bend is positioned. It will be apparent that the solder rings are positioned a predetermined distance from the ends of the return bend legs 53, due to the fact that the cylinders 83 are not powered until the return bend is positioned on the contact plates 95. The rings are formed by the blades as above described and are so affixed to the return bend that they are not displaced during subsequent handling prior to the soldering opertion for attachment to the ends of the heat exchanger tubes indicated at 140, FIG. 7. In that figure, the indentations in the rings affected by the projections 65 are indicated at 141.

Figure 6:
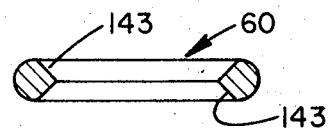
FIG. 6 is an enlarged sectional view of a solder ring.

Preferably the inner surfaces of the rings 60 are inclined at opposite sides of the rings toward the axis of the ring as indicated at 143, FIG. 6. This formation of the rings adds to the convenience of inserting the legs of the return bend in the rings positioned on the guide block at the ring applying station, see FIG. 4. The rings move successively through the chutes 57 and the passages 47. The stop 50 serves to position the rings in substantial registration with the holes 51. Due to the taper 143 on the rings they are moved to more exact registration with the holes 51 upon insertion of the return bend legs in the apertures 51.

While in the preferred embodiment shown there is a pair of movable forming blades or jaws 36, 37 and each is formed with a pair of projections 65 for engaging each ring 60 at the opposite sides thereof, it will be apparent the blade structure may be modified without departing from the important features of our invention. For example one blade may be fixed and the other movable. The fixed blade would serve as a backup blade during the forming operation. On the other hand each of the blades of the pair may be formed with a single projection for engaging each of the rings. In that case only one side portion of the ring is bowed or bulged outwardly and the remainder of the ring is drawn tightly about the work piece. With such arrangement the rings are properly affixed to the work pieces, however, greater force has to be applied to the blades 36, 37. It will also be understood that the jaws 36, 37 may be moved into and out of engagement with the rings by other than a sliding movement.

In order to prevent displacement of the rings position at the ring applying station the upper surface of the cover plate 40 is formed with recesses 148 at each side of each aperture 90 and extending outwardly therefrom. The recesses 148 incline downwardly toward the apertures and a flat spring 150 is fixed in each recess as by screw 151. The inner ends of the springs 150 are of concave configuration and the ends of the springs contiguous to one aperture 90 form an opening dimension to receive the leg of the return bend for insertion in the apertures 51. However, the inner ends of the springs overhang the solder ring and prevent it from being displaced. Subsequent to the rings being affixed to the legs of the return bends they can be readily moved upwardly out of the apertures 51. The ends of the springs 150 flex sufficiently to permit removal of the return bends with the rings fixed thereon.

While we have described a preferred embodiment of our invention, it is to be understood that the invention is not limited thereto, but may be otherwise embodied within the scope of the following claims.

We claim:

1. A method of attaching a loosely fitting solder ring of a material capable of taking a permanent set upon deformation thereof, to a tubular work piece preliminary to soldering the work piece to another member, which includes the steps of:
   A. assembling the solder ring over the exterior of the work piece and positioning the solder ring at a predetermined axial location along the exterior surface of the work piece;
   B. engaging the solder ring along the outer circumference thereof with a pair of spaced engagement points;
   C. relatively moving the engagement points and the assembled solder ring and work piece toward each other in a path lying substantially in the plane of the slder ring so that said engagement points move relative to said solder ring in paths having a projection which is spaced from the center of the solder ring and work piece;
   D. applying sufficient pressure to the engagement points to draw and deform the portion of the solder ring lying between the engagement points closely about the exterior surface of the work piece, and to bow and deform another portion of the solder ring outwardly in the plane thereof from the work piece, whereby the solder ring is tightly engaged with the exterior of the work piece at the desired location thereon, thereby enabling the work piece and solder ring to be transported and manipulated as an integral unit for further processing.

2. A method of attaching a loosely fitting solder ring of a material capable of taking a permanent set upon deformation thereof, to a tubular work piece preliminary to soldering the work piece to another member, which includes the steps of:
   A. assembling the solder ring over the exterior of the work piece and positioning the solder ring at a predetermined axial location along the exterior surface of the work piece;
   B. engaging the solder ring with a pair of spaced engagement points which are spaced along the outer circumference thereof by an arc of less than 180°;
   C. relatively moving the engagement points and the assembled solder ring and work piece toward each other in a path lying substantially in the plane of the solder ring and which is substantially parallel with the diameter of said solder ring bisecting the arc formed between said engagement points so that said engagement points move relative to said solder ring in paths having a projection which is spaced from the center of the solder ring and work piece;
   D. supporting the portion of solder ring which lies on the side thereof opposite the arc formed between the engagement points so that said portion of the solder ring lies in contact with and is supported against the adjacent portion of the work piece; and
   E. applying sufficient pressure to the engagement points to draw and deform the included portion of the solder ring lying between the engagement points closely about the exterior surface of the work piece in the region between the spaced points, and to bow and deform the solder ring outwardly in the plane thereof from the work piece at a location outside the region between the spaced engagement points, whereby the solder ring is tightly engaged with the exterior of the work piece at the desired location thereon, thereby enabling the work piece and solder ring to be transported and manipulated as an integral unit for further processing.

3. A method as defined in claim 2 including the steps of:
   A. positioning the solder ring in a slot of a guide block in registration with an aperture extending transversely through the guide block;
   B. assembling the solder ring with the work piece by inserting the work piece through the solder ring and through the transverse aperture in registration with the solder ring until the work piece engages a stop to thereby accurately position the solder ring at the desired location along the exterior surface of the work piece; and
   C. engaging the solder ring with the pair of spaced engagement points by moving a forming blade carrying said pair of spaced engagement points in a slot in said guide block lying in the plane of the solder ring at an angle of the plane of the slot used to initially position the solder ring until said engagement points engage the solder ring.

4. A method as defined in claim 2 wherein the step of supporting the solder ring against the work piece on the side thereof opposite the arc formed by said engagement points includes engaging and supporting the solder ring against the work piece with another pair of spaced engagement points which are spaced about the outer circumference of the solder ring and which lie on the opposite side of said solder ring and work piece from said first named pair of engagement points; and including the step of simultaneously moving both pairs of spaced engagement points toward the assembled solder ring and work piece on an axis substantially parallel to a diameter bisecting both of the arcs formed by said pairs of spaced engagement points on the outer circumference of the solder ring; and applying sufficient pressure to both pairs of engagemnet points so that said other pair of spaced engagement points also cause drawing and deforming of the included portion of the solder ring lying therebetween into close engagement with the work piece and assist in bowing and deforming the solder ring outwardly from the work piece at a location outside the region between both pairs of spaced engagement points.

* * * * *